(12) United States Patent
Hagiwara

(10) Patent No.: US 9,411,130 B2
(45) Date of Patent: Aug. 9, 2016

(54) PHOTOGRAPHING LENS AND ELECTRONIC APPARATUS

(71) Applicant: SAMSUNG ELECTRONICS CO., LTD., Suwon-si, Gyeonggi-do (KR)

(72) Inventor: Hiroyuki Hagiwara, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 1 day.

(21) Appl. No.: 14/096,258

(22) Filed: Dec. 4, 2013

(65) Prior Publication Data

US 2014/0153117 A1    Jun. 5, 2014

(30) Foreign Application Priority Data

Dec. 4, 2012    (JP) .................................. 2012-265588
Jul. 16, 2013    (KR) ........................ 10-2013-0083572

(51) Int. Cl.
*G02B 3/02* (2006.01)
*G02B 13/18* (2006.01)
*G02B 9/62* (2006.01)
*G02B 13/00* (2006.01)

(52) U.S. Cl.
CPC .............. *G02B 13/0045* (2013.01); *G02B 9/62* (2013.01); *G02B 13/18* (2013.01)

(58) Field of Classification Search
CPC ....... G02B 13/18; G02B 9/62; G02B 13/0045
USPC .................................. 359/713, 757, 752, 756
See application file for complete search history.

(56) References Cited

U.S. PATENT DOCUMENTS

| 2012/0188654 | A1 | 7/2012 | Huang | |
|---|---|---|---|---|
| 2013/0033762 | A1* | 2/2013 | Tsai et al. | ..................... 359/713 |
| 2013/0176469 | A1 | 7/2013 | Sano et al. | |
| 2013/0235473 | A1* | 9/2013 | Chen et al. | ..................... 359/713 |
| 2013/0329306 | A1* | 12/2013 | Tsai | ................. G02B 13/0045 359/713 |
| 2013/0342918 | A1* | 12/2013 | Kubota et al. | ................. 359/713 |
| 2014/0347745 | A1* | 11/2014 | Shinohara | ................. G02B 9/62 359/713 |

FOREIGN PATENT DOCUMENTS

| JP | 2012-155223 A | 8/2012 |
|---|---|---|
| KR | 10-2010-0040357 A | 4/2010 |
| KR | 10-2011-0024872 A | 5/2011 |
| WO | WO 2010/024198 A1 | 5/2010 |

* cited by examiner

*Primary Examiner* — William Choi
(74) *Attorney, Agent, or Firm* — Drinker Biddle & Reath LLP

(57) ABSTRACT

Provided are photographing optical lens assembly and an electronic apparatus. The photographing optical lens assembly includes a first lens having a positive refractive power, a second lens having a negative refractive power, a third lens; a fourth lens, a fifth lens having a positive refractive power, and a sixth lens having a negative refractive power. The first to sixth lenses are sequentially arranged from an object side to an image side, and the sixth lens has a concave image-side surface in a region around an optical axis.

15 Claims, 9 Drawing Sheets

PHOTOGRAPHING LENS AND ELECTRONIC APPARATUS

CROSS-REFERENCE TO RELATED PATENT APPLICATIONS

This application claims the priority benefit of Japanese Patent Application No. 2012-265588, filed on Dec. 4, 2012, in the Japanese Patent Office, and Korean Patent Application No. 10-2013-0083572, filed on Jul. 16, 2013, in the Korean Intellectual Property Office, the disclosures of which are incorporated herein in their entirety by reference.

BACKGROUND

1. Field

One or more embodiments of the invention relate to a small photographing lens system and an electronic apparatus including the photographing lens system.

2. Description of the Related Art

Many photographing apparatuses employ solid-state photographing devices such as charge-coupled device (CCD) image sensors and complementary metal-oxide semiconductor (CMOS) image sensors. Examples of such photographing apparatuses include digital still cameras, video cameras, and interchangeable lens cameras. Since photographing apparatuses employing solid-state photographing devices can have small sizes, recent small information terminals such as cellular phones use such photographing apparatuses. Customers demand high-performance devices such as high-resolution, wide-angle devices. In addition, an increasing number of customers have gained a substantial amount of knowledge about cameras.

Small and high-pixel photographing apparatuses require high-resolution and high-performance photographing lenses. Although bright lenses having an F-number of 2.8 or less have been developed, it is difficult for the bright lenses to have sufficient optical performance due to the influence of diffraction.

SUMMARY

One or more embodiments of the invention include a photographing optical lens assembly having a small size and high imaging performance.

One or more embodiments of the present invention include an electronic apparatus (e.g., a photographing apparatus) having small, high-performance photographing optical lens assembly.

Additional aspects will be set forth in part in the description which follows and, in part, will become apparent from the description, or may be learned by practice of the presented embodiments.

According to one or more embodiments, photographing optical lens assembly includes a first lens having a positive refractive power, a second lens having a negative refractive power, a third lens, a fourth lens, a fifth lens having a positive refractive power, and a sixth lens having a negative refractive power. The first to sixth lenses are sequentially arranged from an object side to an image side. The sixth lens has a concave image-side surface in a region around an optical axis. The photographing optical lens assembly satisfies the following formula:

$$1.0 < f3/f < 3.0, \qquad \text{<Formula>}$$

where f denotes a focal length of the photographing optical lens assembly, and f3 denotes a focal length of the third lens.

According to one or more embodiments, photographing optical lens assembly includes a first lens having a positive refractive power, a second lens having a negative refractive power, a third lens, a fourth lens, a fifth lens having a positive refractive power, and a sixth lens having a negative refractive power. The first to sixth lenses are sequentially arranged from an object side to an image side. The sixth lens has is a concave image-side surface in a region around an optical axis. The photographing optical lens assembly satisfies the following formulas:

$$r11 < |r12|, \qquad \text{<Formula>}$$

$$|r52| < |r42|,$$

where r11 denotes a paraxial radius of curvature of an object-side surface of the first lens, r12 denotes a paraxial radius of curvature of an image-side surface of the first lens, r42 denotes a paraxial radius of curvature of an image-side surface of the fourth lens, and r52 denotes a paraxial radius of curvature of an image-side surface of the fifth lens.

According to one or more embodiments, photographing optical lens assembly includes a first lens having a positive refractive power, a second lens having a negative refractive power, a third lens, a fourth lens, a fifth lens having a positive refractive power, and a sixth lens having a negative refractive power. The first to sixth lenses are sequentially arranged from an object side to an image side. The fourth lens has a concave image-side surface in a region around an optical axis, and the sixth lens has a concave image-side surface in a region around the optical axis.

The sixth lens may have at least one inflection point at a position that does not intersect the optical axis.

The first lens may have a convex object-side surface, and the second lens may have a concave image-side surface.

The photographing optical lens assembly may satisfy the following formula:

$$20 < v1 - v2 < 70, \qquad \text{<Formula>}$$

where v1 denotes an Abbe number of the first lens, and v2 denotes an Abbe number of the second lens.

The third lens may have a concave meniscus shape toward the image side in a region around the optical axis.

The third lens may have a positive refractive power.

The photographing optical lens assembly may satisfy the following formula:

$$-3.5 < f2/f < -0.5, \qquad \text{<Formulas>}$$

where f2 denotes a focal length of the second lens, and f denotes the focal length of the photographing optical lens assembly.

The the fourth lens may have a concave image-side surface in a region around the optical axis, and the fourth lens may have at least one inflection point at a position that does not intersect the optical axis.

The fourth lens may have a positive refractive power.

The photographing optical lens assembly may satisfy the following formulas:

$$0.4 < f1/f < 1.5,$$

$$1.0 < f4/f, \qquad \text{<Formulas>}$$

where f1 denotes a focal length of the first lens, and f4 denotes a focal length of the fourth lens.

The sixth lens may have a bi-concave shape in a region around the optical axis.

The photographing optical lens assembly may satisfy the following formulas:

$$0.2 < f5/f < 1.5,$$

$$-1.5 < f6/f < -0.1, \qquad <\text{Formula}>$$

where f5 denotes a focal length of the fifth lens, f6 denotes a focal length of the sixth lens, and f denotes the focal length of the photographing optical lens assembly.

The photographing optical lens assembly may satisfy the following formula:

$$-2.0 < (r11+r12)/(r11-r12) < -0.1, \qquad <\text{Formula}>$$

where r11 denotes a paraxial radius of curvature of an object-side surface of the first lens, and r12 denotes a paraxial radius of curvature of an image-side surface of the first lens.

The first to sixth lenses may be formed of a plastic material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
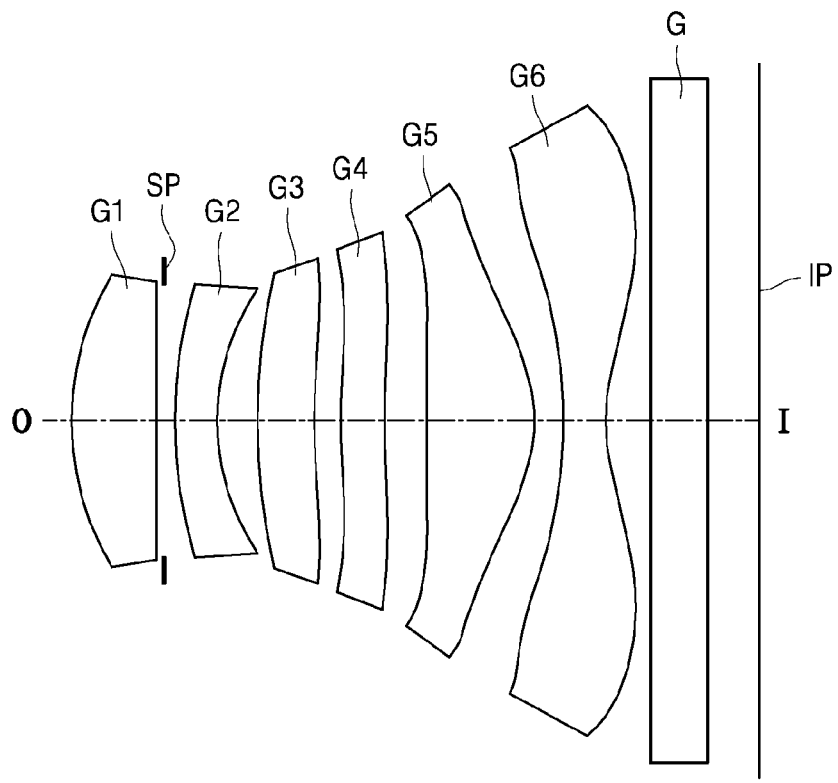
FIG. 1 illustrates a photographing optical lens assembly, according to a first embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

Hereinafter, a photographing optical lens assembly and an electronic apparatus including the photographing optical lens assembly will be described in detail according to embodiments of the invention with reference to the accompanying drawings.

FIG. 1 illustrates a photographing optical lens assembly, according to a first embodiment. The photographing optical lens assembly includes a first lens G1, a second lens G2, a third lens G3, a fourth lens G4, a fifth lens G5, and a sixth lens G6 arranged sequentially from an object side O to an image side I.

An optical aperture stop SP may be disposed beside the image-side surface of the first lens G1. For example, a sheet-shaped aperture stop SP may be disposed between the first lens G1 and the second lens G2. An optical block G may be disposed beside the image-side surface of the sixth lens G6. In other words, an optical block G may be disposed between an image plane IP and the sixth lens G6. For example, the optical block G may include an optical filter or a phase plate. In another example, a flat optical member such as a glass cover or an infrared cut-off filter may be disposed as the optical block G.

If the photographing optical lens assembly are used in a photographing optical system in an electronic device, e.g., a mobile phone having photographing capabilities, an interchangeable lens camera, a surveillance camera, a video camera, or a digital still camera, the image plane IP may correspond to a photographing surface of a photographing device (photoelectric conversion device) such as a charge-coupled device (CCD) sensor or a complementary metal-oxide semiconductor (CMOS) sensor. If the photographing optical lens assembly are used in a silver salt film camera, the image plane IP may correspond to the surface of a silver salt film.

The first lens G1 may have a positive refractive power. The first lens G1 has a convex object-side surface. In the current embodiment, the object-side surface of the first lens G1 may have a paraxial radius of curvature that is smaller than that of the image-side surface of the first lens G1.

If the first lens G1 is a positive lens, light incident on the photographing optical lens assembly may be condensed, and the other lenses arranged after the first lens G1 may have small sizes.

In addition, if the object-side surface of the first lens G1 is convex toward the object side O, light incident on the photographing optical lens assembly may be condensed, and the photographing optical lens assembly may have high imaging performance even though the other lenses arranged after the first lens G1 are small.

The second lens G2 has a negative refractive power.

The image-side surface of the second lens G2 may have a concave meniscus shape.

The second lens G2 may be a negative lens. In this case, light rays incident on the image plane IP may reach the peripheral region of an image.

The second lens G2 may have a concave image-side surface. In this case, comatic aberration may be properly corrected, and high imaging performance may be obtained.

The third lens G3 may have a positive refractive power.

The third lens G3 may have a meniscus shape having a concave image-side surface. For example, the image-side surface of the third lens G3 may be concave in a region around the optical axis of the photographing optical lens assembly.

If the image-side surface of the third lens G3 is concave, the function of the image-side surface of the second lens G2 may be expanded to the image-side surface of the third lens G3, and assembly deviation of the photographing optical lens assembly may be reduced to increase the imaging performance of the photographing optical lens assembly. In addition, if the third lens G3 has a positive meniscus shape, aberration may be markedly corrected throughout an image including the peripheral region of the image.

The fourth lens G4 may have a positive refractive power.

The image-side surface of the fourth lens G4 may have a concave meniscus shape. For example, the fourth lens G4 may have a concave image-side surface in a region around the optical axis of the photographing optical lens assembly.

The image-side surface of the fourth lens G4 may have at least one inflection point at a position that is not the intersection of the optical axis with the photographing optical lens assembly. Thus, the refractive power of the image-side surface of the fourth lens G4 may be distributed, and assembly deviation of the photographing optical lens assembly may be reduced to increase the imaging performance of the photographing optical lens assembly. Herein, the term "inflection point" means a point at which the refractive power (or curvature) changes from positive (+) to negative (−), or from negative (−) to positive (+).

In addition, if the fourth lens G4 is a positive lens, the power (refractive power) of positive lenses of the photographing optical lens assembly may be spread out, and aberration may be corrected throughout an image including the peripheral region of the image.

The fifth lens G5 may have a positive refractive power.

The image-side surface of the fifth lens G5 may have a positive convex meniscus shape.

In the current embodiment, the paraxial radius of curvature of the image-side surface of the fifth lens G5 may be smaller than the paraxial radius of curvature of the image-side surface of the fourth lens G4.

High imaging performance may be obtained by employing the above-described third lens G3, fourth lens G4, and fifth lens G5.

The sixth lens G6 may have a negative refractive power.

The sixth lens G6 may have a concave image-side surface in a region around the optical axis of the photographing optical lens assembly. The sixth lens G6 may have at least one inflection point at a position that is not the intersection of the optical axis with the photographing optical lens assembly. For example, the image-side surface of the sixth lens G6 may be concave in a region from the optical axis of the photographing optical lens assembly to the inflection point.

The sixth lens G6 may have a bi-concave shape to spread the negative refractive power of the photographing optical lens assembly. In addition, since the angle of light rays incident on the image plane IP is controlled using the object-side surface of the sixth lens G6 as well as the image-side surface of the sixth lens G6, the imaging performance of the photographing optical lens assembly may be high in the peripheral region of an image. In addition, all kinds of aberrations may be corrected in the peripheral region of the image.

In addition, according to the current embodiment, the first to sixth lenses G1 to G6 may be moved for focusing from infinity to proximity. Focusing may be performed by moving some of the first to sixth lenses G1 to G6. However, focusing in the range from infinity to proximity may be performed by moving all of the first to sixth lenses G1 to G6. In this case, the performance of the first to sixth lenses G1 to G6 may be increased even though the sizes of the first to sixth lenses G1 to G6 are reduced.

In the current embodiment, the photographing optical lens assembly may satisfy the following formula:

$$-1.0 < r42/f \qquad \text{<Formula 1>}$$

In Formula 1, r42 denotes the paraxial radius of curvature of the image-side surface of the fourth lens G4, and f denotes the focal length of the photographing optical lens assembly.

Formula 1 describes the relationship between the paraxial radius of curvature of the image-side surface of the fourth lens G4 and the focal length of the photographing optical lens assembly. If r42/f is less than the lower limit in Formula 1, the curvature of the image-side surface of the fourth lens G4 is excessively large, and thus light rays may be excessively converged at the image-side surface of the fourth lens G4. In this case, the total length of the photographing optical lens assembly may need to be increased to ensure a desired image height, and thus it may be difficult to reduce the size of the photographing optical lens assembly.

For example, the photographing optical lens assembly may satisfy the following formula:

$$-0.8 < r42/f < 2.8 \qquad \text{<Formula 1a>}$$

In the current embodiment, the photographing optical lens assembly may satisfy the formulas below. In this case, the photographing optical lens assembly may satisfy Formula 1 or may not satisfy Formula 1.

$$r11 < |r12| \qquad \text{<Formula 2>}$$

$$|r52| < |r42| \qquad \text{<Formula 3>}$$

In Formulas 2 and 3, r11 denotes the paraxial radius of curvature of the object-side surface of the first lens G1, r12 denotes the paraxial radius of curvature of the image-side surface of the first lens G1, r42 denotes the paraxial radius of curvature of the image-side surface of the fourth lens G4, and r52 denotes the paraxial radius of curvature of the image-side surface of the fifth lens G5.

Formula 2 describes the relationship between the paraxial radius of curvature of the object-side surface of the first lens G1 and the paraxial radius of curvature of the image-side surface of the first lens G1. If the magnitude of the radius of curvature of the image-side surface of the first lens G1 is smaller than that of the object-side surface of the first lens G1, it may be difficult to correct the comatic aberration of the image-side surface of the first lens G1. In addition, if the magnitude of the radius of curvature of the object-side surface of the first lens G1 is greater than that of the image-side surface of the first lens G1, a sufficient converging effect may not be obtained, and it may be difficult to reduce the sizes of the other lenses arranged after the first lens G1.

Formula 3 describes the relationship of the magnitudes of the paraxial radius of curvature of the image-side surface of the fourth lens G4 to the paraxial radius of curvature of the image-side surface of the fifth lens G5.

If magnitude of the radius of curvature of the image-side surface of the fourth lens G4 is smaller than that of the image-side surface of the fifth lens G5, a converging effect may be excessive, and thus the total length of the photographing optical lens assembly may need to be increased to obtain a desired image height. That is, the size of the photographing optical lens assembly may be increased. If the magnitude of the radius of curvature of the image-side surface of the fifth lens G5 is greater than that of the image-side surface of the fourth lens G4, it is difficult to correct the angle of a light ray incident on the image plane IP from the sixth lens G6 and aberration in the peripheral region of an image.

In the current embodiment, the photographing optical lens assembly may satisfy the following formula:

$$20 < v1 - v2 < 70 \quad \text{<Formula 4>}$$

In Formula 4, v1 denotes the Abbe number of the first lens G1, and v2 denotes the Abbe number of the second lens G2.

Formula 4 describes the relationship between the Abbe number of the first lens G1 and the Abbe number of the second lens G2. If Formula 4 is satisfied, chromatic aberration may be reduced or removed. For example, the first and second lenses G1 and G2 may be formed of glass. If (v1−v2) exceeds the upper limit in Formula 4, it may be difficult to form the first and second lenses G1 and G2 using an inexpensive, stable material such as glass.

If (v1−v2) is less than the lower limit in Formula 4, it may be difficult to correct axial chromatic aberration or chromatic difference of magnification.

For example, the photographing optical lens assembly may satisfy the following formula:

$$23 < v1 - v2 < 50 \quad \text{<Formula 4a>}$$

In the current embodiment, the photographing optical lens assembly may satisfy the following formulas:

$$-3.5 < f2/f < -0.5 \quad \text{<Formula 5>}$$

$$1.0 < f3/f < 30.0 \quad \text{<Formula 6>}$$

In Formulas 5 and 6, f2 denotes the focal length of the second lens G2, f3 denotes the focal length of the third lens G3, and f denotes the focal length of the photographing optical lens assembly.

Formula 5 describes the relationship between the focal length of the second lens G2 and the focal length of the photographing optical lens assembly.

If (f2/f) exceeds the upper limit in Formula 5, the refractive power of the second lens G2 is strong, which may result in an excessive degree of a diverging effect, and thus it may be difficult to correct aberration in the peripheral region of an image.

If (f2/f) is less than the lower limit in Formula 5, the refractive power of the second lens G2 is weak, which may result in a low degree of a diverging effect, and thus it is difficult to increase the angle of laterally incident light rays. Therefore, it is difficult to decrease the size of the photographing optical lens assembly.

Formula 6 describes the relationship between the focal length of the third lens G3 and the focal length of the photographing optical lens assembly. If (f3/f) exceeds the upper limit in Formula 6, the refractive power of the third lens G3 is weak, and thus it is difficult to correct lateral light rays diverged by the second lens G2 and aberration in the peripheral region of an image.

If (f3/f) is less than the lower limit in Formula 6, the refractive power of the third lens G3 is too strong, which may result in an excessive degree of a converging effect, and thus the total length of the photographing optical lens assembly may need to be increased to ensure a desired image height. Therefore, it may be difficult to reduce the size of the photographing optical lens assembly.

In an embodiment, the photographing optical lens assembly may satisfy the following formula: $1.0 < f3/f < 3.0$.

For example, the photographing optical lens assembly may satisfy the following formulas:

$$-2.5 < f2/f < -0.8 \quad \text{<Formula 5a>}$$

$$2.0 < f3/f < 20.0 \quad \text{<Formula 6a>}$$

In the current embodiment, the photographing optical lens assembly may satisfy the following formulas:

$$0.4 < f1/f < 1.5 \quad \text{<Formula 7>}$$

$$1.0 < f4/f \quad \text{<Formula 8>}$$

In Formulas 7 and 8, f1 denotes the focal length of the first lens G1, f4 denotes the focal length of the fourth lens G4, and f denotes the focal length of the photographing optical lens assembly.

Formula 7 describes the relationship between the focal length of the first lens G1 and the focal length of the photographing optical lens assembly. If (f1/f) satisfies Formula 7, the photographing optical lens assembly may have less-sensitive, small-sized, and high-performance characteristics.

If (f1/f) exceeds the upper limit in Formula 7, the refractive power of the first lens G1 is weak, and thus the first lens G1 may be formed to have a large diameter. That is, the photographing optical lens assembly may have a large size.

If (f1/f) is less than the lower limit in Formula 7, the refractive power of the first lens G1 is strong, and thus it may be difficult to correct the aberration of the photographing optical lens assembly to increase the performance of the photographing optical lens assembly.

Formula 8 describes the relationship between the focal length of the fourth lens G4 and the focal length of the photographing optical lens assembly.

If (f4/f) is less than the lower limit in Formula 8, the refractive power of the fourth lens G4 is strong, which may result in an excessive degree of a converging effect, and thus it may be difficult to correct aberration such as astigmatic aberration.

For example, the photographing optical lens assembly may satisfy the following formulas:

$$0.6 < f1/f < 1.0 \quad \text{<Formula 7a>}$$

$$2.0 < f4/f < 115 \quad \text{<Formula 8a>}$$

In the current embodiment, the photographing optical lens assembly may satisfy the following formulas:

$$0.2 < f5/f < 1.5 \quad \text{<Formula 9>}$$

$$-1.5 < f6/f < -0.1 \quad \text{<Formula 10>}$$

In Formulas 9 and 10, f5 denotes the focal length of the fifth lens G5, f6 denotes the focal length of the sixth lens G6, and f denotes the focal length of the photographing optical lens assembly.

Formula 9 describes the relationship between the focal length of the fifth lens G5 and the focal length of the photographing optical lens assembly.

If (f5/f) exceeds the upper limit in Formula 9, the refractive power of the fifth lens G5 is weak, which may result in an insufficient degree of convergence at the fifth lens G5, and thus it may be difficult to adjust the angle of light rays incident on the image plane IP using the sixth lens G6.

If (f5/f) is less than the lower limit in Formula 9, the refractive power of the fifth lens G5 is strong, which may result in an excessive degree of a converging effect, and thus it may be difficult to correct aberration such as astigmatic aberration.

Formula 10 describes the relationship between the focal length of the sixth lens G6 and the focal length of the photographing optical lens assembly.

If (f6/f) exceeds the upper limit in Formula 10, the refractive power of the sixth lens G6 is strong, which may result in an excessive degree of a diverging effect, and thus it may be difficult to obtain a desired angle of incidence on the image plane IP.

If (f6/f) is less than the lower limit in Formula 10, the refractive power of the sixth lens G6 is weak, which may result in a low degree of a diverging effect, and thus it may be difficult to correct astigmatic aberration in a region around the center of an image.

For example, the photographing optical lens assembly may satisfy the following formulas:

All the first to sixth lenses G1 to G6 may be formed of the same plastic material.

In this case, variations of refractive indexes and shapes of the first to sixth lenses G1 to G6 caused by temperature changes may cancel each other out, to reduce deterioration in the performance of the first to sixth lenses G1 to G6.

As described above, according to the current embodiment, the photographing optical lens assembly includes six lenses, a small F-number (Fno), a small size, a high degree of imaging performance, and fewer manufacturing errors.

Hereinafter, first to eighth embodiments of the invention will be described.

Table 1 shows that each embodiment satisfies the above-described conditions.

TABLE 1

| Formulas | E*1 | E2 | E3 | E4 | E5 | E6 | E7 | E8 |
|---|---|---|---|---|---|---|---|---|
| (1) | 0.937 | 2.784 | 1.924 | 1.590 | 1.527 | 1.505 | 1.480 | −0.800 |
| (4) | 34.221 | 34.221 | 34.221 | 34.221 | 34.221 | 34.221 | 34.221 | 34.221 |
| (5) | −1.246 | −0.879 | −0.956 | −0.959 | −1.116 | −1.138 | −1.067 | −2.409 |
| (6) | 6.296 | 7.659 | 14.999 | 12.326 | 5.698 | 20.000 | 3.183 | 2.195 |
| (7) | 0.881 | 0.706 | 0.660 | 0.825 | 0.757 | 0.800 | 0.773 | 0.970 |
| (8) | 32.732 | 12.263 | 29.104 | 2.345 | 26.921 | 44.860 | 112.815 | 52.622 |
| (9) | 0.466 | 0.467 | 0.461 | 0.462 | 0.992 | 0.302 | 0.518 | 0.480 |
| (10) | −0.419 | −0.407 | −0.389 | −0.388 | −0.919 | −0.261 | −0.422 | −0.352 |
| (11) | −0.913 | −0.708 | −0.645 | −0.945 | −0.757 | −0.962 | −0.159 | −1.500 |

*E: Embodiment $$0.3 < f5/f < 1.0 \quad \langle \text{Formula 9a} \rangle$$

$$-1.0 < f6/f < -0.2 \quad \langle \text{Formula 10a} \rangle$$

In the current embodiment, the photographing optical lens assembly may satisfy the following formula:

$$-2.0 < (r11+r12)/(r11-r12) < -0.1 \quad \langle \text{Formula 11} \rangle$$

In Formula 11, r11 denotes the paraxial radius of curvature of the object-side surface of the first lens G1, and r12 denotes the paraxial radius of curvature of the image-side surface of the first lens G1.

Formula 11 describes the relationship between the paraxial radius of curvature of the object-side surface of the first lens G1 and the paraxial radius of curvature of the image-side surface of the first lens G1.

If [(r11+r12)/(r11−r12)] exceeds the upper limit in Formula 11, the curvature of the image-side surface of the first lens G1 is too convex, and thus it may be difficult to correct comatic aberration caused by eccentricity.

If the curvature of the object-side surface of the first lens G1 is small, the first lens G1 may have an insufficient converging power, and thus it may be difficult to reduce the total length of the photographing optical lens assembly.

If [(r11+r12)/(r11−r12)] is less than the lower limit in Formula 11, the curvature of the image-side surface of the first lens G1 is too concave. Therefore, the first lens G1 may have an insufficient converging power, and it may be difficult to reduce the total length of the photographing optical lens assembly.

Furthermore, in this case, it may be difficult to make the object-side surface of the first lens G1 convex.

For example, the photographing optical lens assembly may satisfy the following formula:

$$-1.5 < (r11+r12)/(r11-r12) < -0.15 \quad \langle \text{Formula 11a} \rangle$$

In each embodiment, the surfaces of lenses are denoted by surface numbers (i) in an order from an object side O to an image side I. ri denotes the radius of curvature of the i-th (lens) surface, di denotes the distance between the i-th surface and the (i+1)th surface, ndi denotes the refractive index of the i-th lens, and vdi denotes the Abbe number of the i-th lens. An asterisk (*) denotes an aspheric lens surface.

The expression "BF" denotes the distance between the rearmost lens surface and the image plane IP along the optical axis, converted into a value in air. The total length of photographing optical lens assembly is the sum of the BF and the distance between the object-side surface of the first lens G1 and the rearmost lens surface (the image-side surface of the sixth lens G6).

Lengths are given in millimeters (mm).

In addition, K denotes a conic constant, A4, A6, A8, A10, and A12 denote aspheric surface coefficients, and the shape of an aspherical lens may be represented by X, which is the displacement of the lens surface from the lens vertex measured in the direction of the optical axis of the lens at a height (h) from the optical axis.

$$X = \frac{h^2/R}{1 + \sqrt{1-(1+K)h^2/R^2}} + \sum A_i h^i \quad \langle \text{Formula 12} \rangle$$

In Formula 12, R denotes a radius of curvature. For example, "E-Z" means "$10^{-Z}$." f denotes a focal length, Fno denotes a F-number, and w denotes a half angle of view.

Embodiment 1

Figure 2:
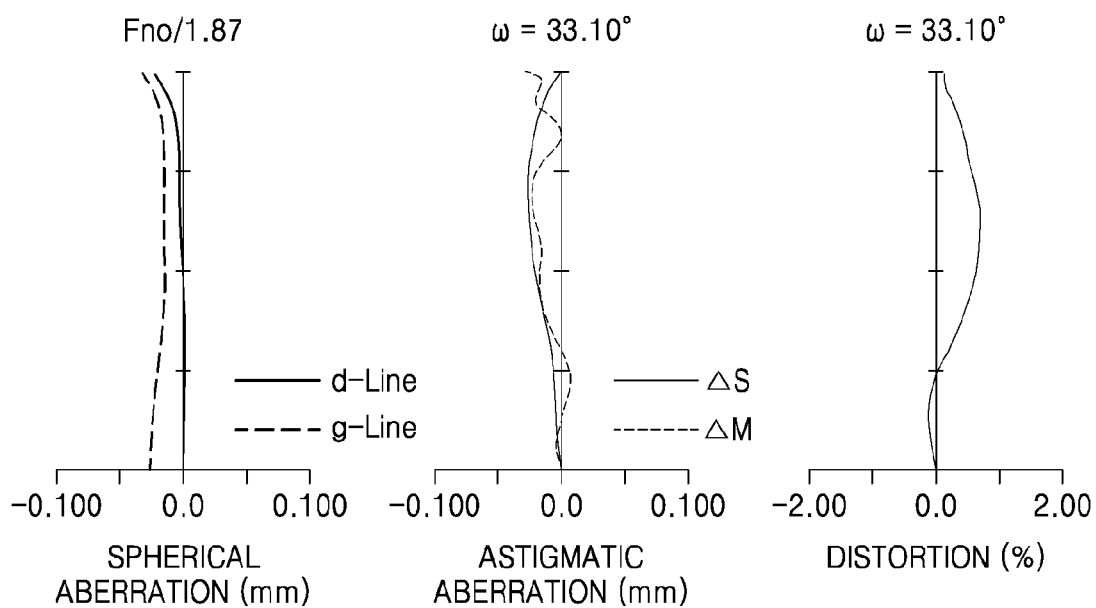
FIG. 2 illustrates aberration diagrams of the photographing optical lens assembly illustrated in FIG. 1.

Tables 2 to 4 show lens data according to a first embodiment. FIG. 1 illustrates a photographing optical lens assembly according to the first embodiment. FIG. 2 illustrates aberration diagrams of the photographing optical lens assembly of the first embodiment.

TABLE 2

| Lens Surfaces | r | d | nd | vd |
|---|---|---|---|---|
| Object side | ∞ | ∞ | | |
| 1* | 3.667 | 1.190 | 1.53113 | 55.75 |
| 2* | −80.507 | 0.100 | | |
| 3 (aperture stop) | ∞ | 0.132 | | |
| 4* | 4.798 | 0.590 | 1.65055 | 21.53 |
| 5* | 2.563 | 0.555 | | |
| 6* | 6.760 | 0.790 | 1.53113 | 55.75 |
| 7* | 8.865 | 0.359 | | |
| 8* | 6.961 | 0.600 | 1.65055 | 21.53 |
| 9* | 7.026 | 0.619 | | |
| 10* | 75.695 | 1.480 | 1.53113 | 55.75 |
| 11* | −1.898 | 0.389 | | |
| 12* | −10.713 | 0.580 | 1.53113 | 55.75 |
| 13* | 2.024 | 0.617 | | |
| 14 | ∞ | 0.800 | 1.51680 | 64.20 |
| 15 | ∞ | 0.700 | | |
| Image Plane | ∞ | | | |

TABLE 3

| Lens Surfaces | K | A4 | A6 | A8 | A10 | A12 |
|---|---|---|---|---|---|---|
| 1 | 0.000E+00 | −6.204E−05 | −2.657E−04 | 4.307E−05 | −8.312E−06 | 0.000E+00 |
| 2 | 0.000E+00 | −1.251E−04 | 8.686E−04 | −2.165E−04 | 1.357E−05 | 0.000E+00 |
| 4 | 0.000E+00 | −1.678E−02 | 4.453E−03 | −6.996E−04 | 4.607E−05 | 0.000E+00 |
| 5 | 0.000E+00 | −2.504E−02 | 4.530E−03 | −6.508E−04 | 3.205E−05 | 0.000E+00 |
| 6 | 0.000E+00 | −5.398E−03 | 4.154E−04 | −2.368E−04 | 6.189E−05 | 0.000E+00 |
| 7 | 0.000E+00 | −1.484E−02 | 2.350E−03 | −5.439E−04 | 6.122E−05 | 0.000E+00 |
| 8 | 0.000E+00 | −2.657E−02 | 1.627E−03 | 2.532E−04 | −3.077E−05 | 0.000E+00 |
| 9 | 0.000E+00 | −2.144E−02 | 1.133E−03 | 1.173E−04 | −9.377E−06 | 0.000E+00 |
| 10 | 0.000E+00 | −4.398E−03 | 2.695E−04 | −3.881E−05 | −2.918E−06 | 0.000E+00 |
| 11 | −5.220E+00 | −9.870E−03 | 2.289E−03 | −1.138E−04 | −1.438E−06 | 0.000E+00 |
| 12 | 1.750E−02 | −1.266E−02 | 1.817E−03 | −7.123E−05 | 3.204E−07 | 0.000E+00 |
| 13 | −8.679E+00 | −1.155E−02 | 1.286E−03 | −1.071E−04 | 4.861E−06 | −9.30E−08 |

TABLE 4

| | |
|---|---|
| Focal length | 7.498 |
| F-number | 1.87 |
| Half angle of view (°) | 33.29 |
| Image height | 4.900 |
| Lens total length | 9.500 |
| BF (in air) | 1.844 |

FIG. 2 illustrates spherical aberration, astigmatic aberration, and distortion of the photographing optical lens assembly of the first embodiment. Meridional astigmatism (ΔM) and sagittal astigmatism (ΔS) are shown as astigmatic aberration. In the following embodiments, such aberration diagrams as those shown in FIG. 2 will be shown.

Embodiment 2

Figure 3:
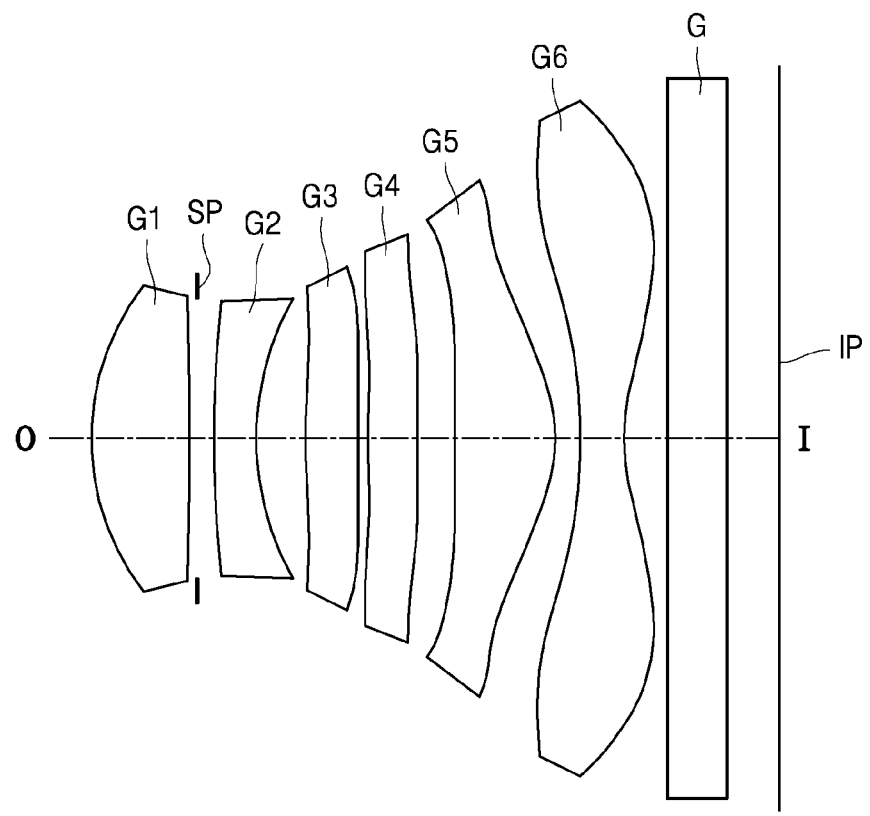
FIG. 3 illustrates a photographing optical lens assembly, according to a second embodiment.
Figure 4:
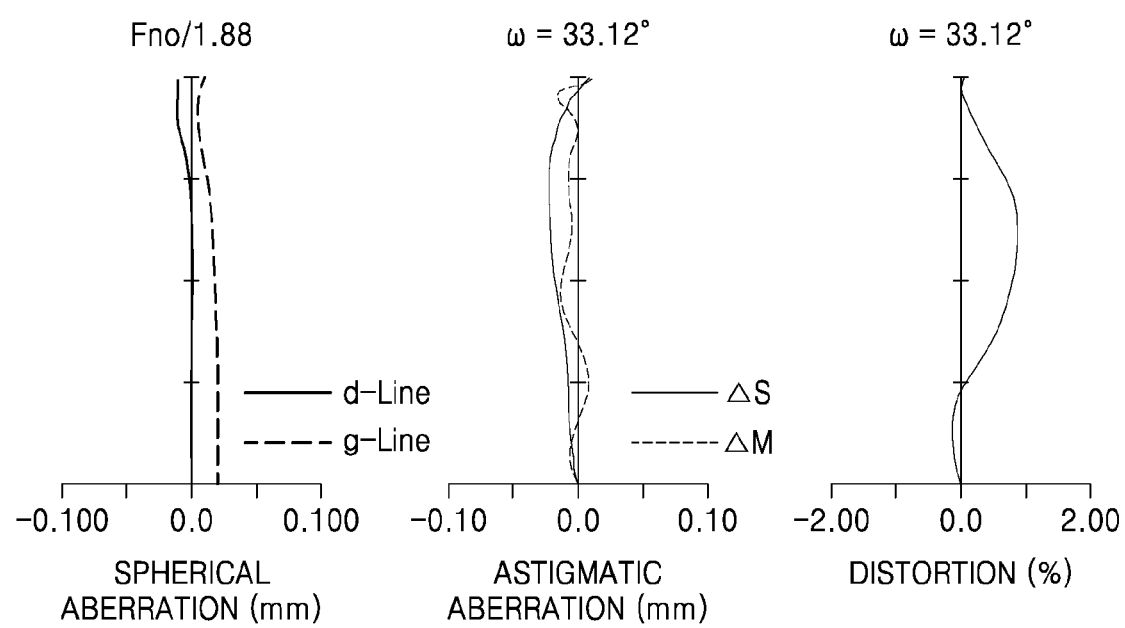
FIG. 4 illustrates aberration diagrams of the photographing optical lens assembly illustrated in FIG. 3.

Tables 5 to 7 show lens data according to a second embodiment. FIG. 3 illustrates a photographing optical lens assembly according to the second embodiment. FIG. 4 illustrates aberration diagrams of the photographing optical lens assembly of the second embodiment.

TABLE 5

| Lens Surfaces | r | d | nd | vd |
|---|---|---|---|---|
| Object side | ∞ | ∞ | | |
| 1* | 3.241 | 1.330 | 1.53113 | 55.75 |
| 2* | −18.951 | 0.100 | | |
| 3 (aperture stop) | ∞ | 0.210 | | |
| 4* | 9.379 | 0.580 | 1.65055 | 21.53 |
| 5* | 2.893 | 0.673 | | |
| 6* | 10.288 | 0.700 | 1.53113 | 55.75 |
| 7* | 15.119 | 0.150 | | |
| 8* | 15.722 | 0.660 | 1.65055 | 21.53 |
| 9* | 20.888 | 0.549 | | |
| 10* | 506.532 | 1.340 | 1.53113 | 55.75 |
| 11* | −1.876 | 0.358 | | |
| 12* | −9.261 | 0.580 | 1.53113 | 55.75 |
| 13* | 2.018 | 0.595 | | |
| 14 | ∞ | 0.800 | 1.51680 | 64.20 |
| 15 | ∞ | 0.700 | | |
| Image Plane | ∞ | | | |

TABLE 6

| Lens surfaces | K | A4 | A6 | A8 | A10 | A12 |
|---|---|---|---|---|---|---|
| 1 | 0.000E+00 | 3.668E−04 | 1.714E−04 | −9.719E−06 | 7.001E−06 | 0.000E+00 |
| 2 | 0.000E+00 | 6.778E−03 | −2.383E−04 | −7.137E−05 | 8.642E−06 | 0.000E+00 |
| 4 | 0.000E+00 | −1.208E−02 | 4.538E−03 | −1.214E−03 | 1.098E−04 | 0.000E+00 |
| 5 | 0.000E+00 | −2.332E−02 | 7.119E−03 | −1.723E−03 | 1.844E−04 | 0.000E+00 |
| 6 | 0.000E+00 | −7.712E−03 | −6.377E−04 | −2.862E−06 | −1.837E−05 | 0.000E+00 |
| 7 | 0.000E+00 | −1.400E−02 | 2.229E−04 | −1.142E−04 | 2.947E−05 | 0.000E+00 |
| 8 | 0.000E+00 | −2.068E−02 | 1.328E−03 | 5.098E−04 | −5.569E−05 | 0.000E+00 |
| 9 | 0.000E+00 | −1.866E−02 | 1.440E−03 | 1.910E−04 | −1.891E−05 | 0.000E+00 |
| 10 | 0.000E+00 | −9.428E−03 | 1.214E−03 | −1.186E−04 | 2.205E−06 | 0.000E+00 |
| 11 | −5.247E+00 | −1.010E−02 | 3.010E−03 | −2.261E−04 | 4.775E−06 | 0.000E+00 |
| 12 | 2.924E+00 | −1.079E−02 | 1.945E−03 | −1.012E−04 | 1.908E−06 | 0.000E+00 |
| 13 | −8.894E+00 | −1.157E−02 | 1.149E−03 | −8.502E−05 | 2.982E−06 | −3.833E−08 |

TABLE 7

| Focal length | 7.503 |
|---|---|
| F-number | 1.88 |
| Half angle of view (°) | 33.29 |
| Image height | 4.900 |
| Lens total length | 9.325 |
| BF (in air) | 1.822 |

TABLE 10

| Focal length | 7.507 |
|---|---|
| F-number | 1.88 |
| Half angle of view (°) | 33.29 |
| Image height | 4.900 |
| Lens total length | 9.202 |
| BF (in air) | 1.814 |

Embodiment 3

Figure 5:
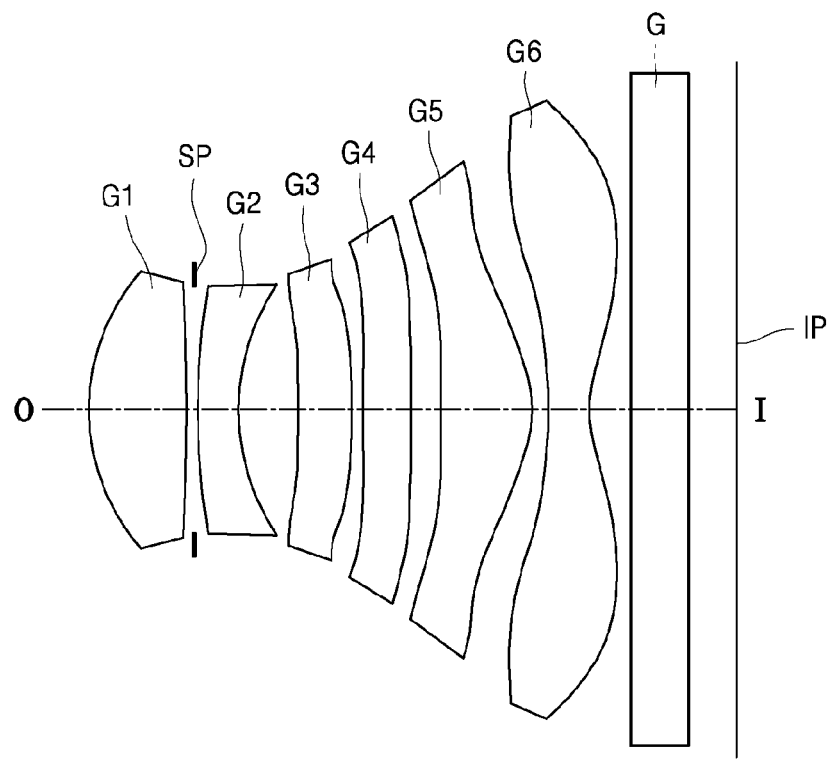
FIG. 5 illustrates a photographing optical lens assembly, according to a third embodiment.
Figure 6:
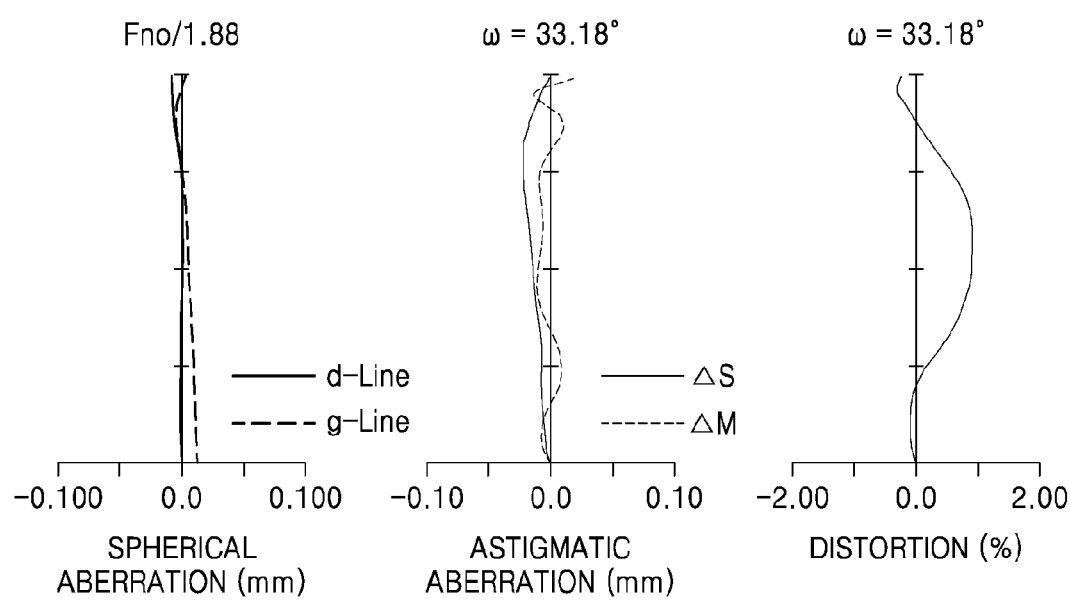
FIG. 6 illustrates aberration diagrams of the photographing optical lens assembly illustrated in FIG. 5.

Tables 8 to 10 show lens data according to a third embodiment. FIG. 5 illustrates a photographing optical lens assembly according to the third embodiment. FIG. 6 illustrates aberration diagrams of the photographing optical lens assembly of the third embodiment.

Embodiment 4

Figure 7:
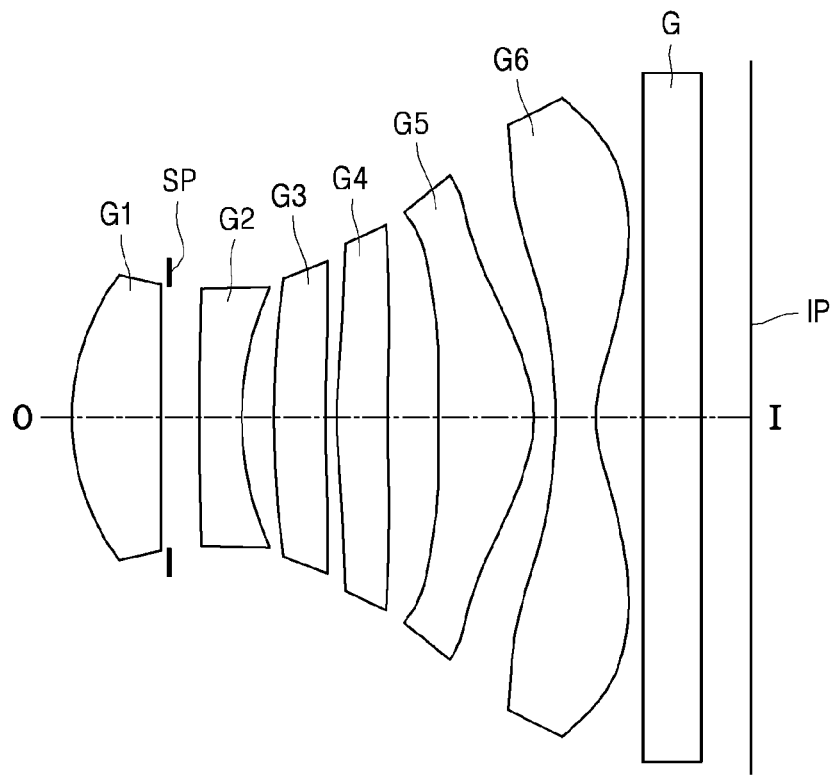
FIG. 7 illustrates a photographing optical lens assembly, according to a fourth embodiment.
Figure 8:
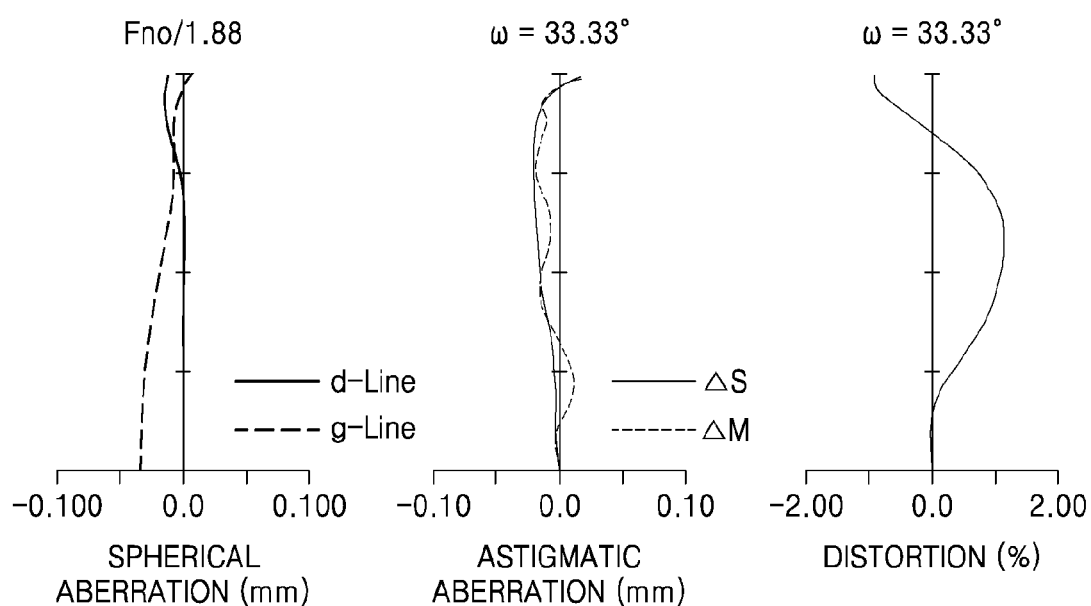
FIG. 8 illustrates aberration diagrams of the photographing optical lens assembly illustrated in FIG. 7.

Tables 11 to 13 show lens data according to a fourth embodiment. FIG. 7 illustrates photographing optical lens assembly according to the fourth embodiment. FIG. 8 illustrates aberration diagrams of the photographing optical lens assembly of the fourth embodiment.

TABLE 8

| Lens surfaces | r | d | nd | vd |
|---|---|---|---|---|
| Object side | ∞ | ∞ | | |
| 1* | 3.128 | 1.380 | 1.53113 | 55.75 |
| 2* | −14.477 | 0.100 | | |
| 3 (aperture stop) | ∞ | 0.050 | | |
| 4* | 7.568 | 0.580 | 1.65055 | 21.53 |
| 5* | 2.818 | 0.854 | | |
| 6* | −24.070 | 0.760 | 1.53113 | 55.75 |
| 7* | −17.372 | 0.151 | | |
| 8* | 13.363 | 0.670 | 1.65055 | 21.53 |
| 9* | 14.440 | 0.477 | | |
| 10* | −102.541 | 1.280 | 1.53113 | 55.75 |
| 11* | −1.821 | 0.233 | | |
| 12* | −9.593 | 0.580 | 1.53113 | 55.75 |
| 13* | 1.901 | 0.587 | | |
| 14 | ∞ | 0.800 | 1.51680 | 64.20 |
| 15 | ∞ | 0.700 | | |
| Image plane | ∞ | | | |

TABLE 11

| Lens surfaces | r | d | nd | vd |
|---|---|---|---|---|
| Object side | ∞ | ∞ | | |
| 1* | 3.384 | 1.240 | 1.53113 | 55.75 |
| 2* | −119.424 | 0.100 | | |
| 3 (aperture stop) | ∞ | 0.445 | | |
| 4* | 11.987 | 0.580 | 1.65055 | 21.53 |
| 5* | 3.329 | 0.454 | | |
| 6* | 9.222 | 0.700 | 1.53113 | 55.75 |
| 7* | 11.043 | 0.150 | | |
| 8* | 6.012 | 0.710 | 1.65055 | 21.53 |
| 9* | 11.930 | 0.746 | | |
| 10* | −73.806 | 1.320 | 1.53113 | 55.75 |
| 11* | −1.814 | 0.288 | | |
| 12* | −11.137 | 0.580 | 1.53113 | 55.75 |
| 13* | 1.839 | 0.655 | | |
| 14 | ∞ | 0.800 | 1.51680 | 64.20 |
| 15 | ∞ | 0.700 | | |
| Image plane | ∞ | | | |

TABLE 9

| Lens surfaces | K | A4 | A6 | A8 | A10 | A12 |
|---|---|---|---|---|---|---|
| 1 | 0.000E+00 | 3.462E−04 | 3.298E−05 | 8.641E−06 | 4.862E−06 | 0.000E+00 |
| 2 | 0.000E+00 | 9.353E−03 | −7.256E−04 | −1.963E−05 | 5.051E−06 | 0.000E+00 |
| 4 | 0.000E+00 | −1.142E−02 | 4.812E−03 | −1.163E−03 | 9.029E−05 | 0.000E+00 |
| 5 | 0.000E+00 | −2.455E−02 | 8.136E−03 | −1.929E−03 | 2.645E−04 | 0.000E+00 |
| 6 | 0.000E+00 | −1.060E−02 | −2.917E−04 | 4.109E−06 | 1.614E−04 | 0.000E+00 |
| 7 | 0.000E+00 | −2.068E−02 | 9.103E−04 | 1.944E−04 | 5.609E−05 | 0.000E+00 |
| 8 | 0.000E+00 | −2.026E−02 | 6.927E−04 | 4.334E−04 | −5.343E−05 | 0.000E+00 |
| 9 | 0.000E+00 | −1.691E−02 | 8.455E−04 | 1.289E−04 | −1.303E−05 | 0.000E+00 |
| 10 | 0.000E+00 | −1.452E−02 | 1.497E−03 | −4.572E−05 | −7.887E−07 | 0.000E+00 |
| 11 | −5.954E+00 | −1.065E−02 | 3.008E−03 | −2.247E−04 | 5.126E−06 | 0.000E+00 |
| 12 | 3.429E+00 | −1.030E−02 | 1.918E−03 | −1.020E−04 | 1.966E−06 | 0.000E+00 |
| 13 | −9.084E+00 | −1.201E−02 | 1.150E−03 | −8.470E−05 | 3.014E−06 | −3.98E−08 |

TABLE 12

| Lens surfaces | K | A4 | A6 | A8 | A10 | A12 |
|---|---|---|---|---|---|---|
| 1 | 0.000E+00 | 3.669E−04 | 1.214E−04 | 1.628E−05 | 2.005E−06 | 0.000E+00 |
| 2 | 0.000E+00 | 1.094E−03 | 6.403E−04 | −1.393E−04 | 7.630E−06 | 0.000E+00 |
| 4 | 0.000E+00 | −1.808E−02 | 4.971E−03 | −1.126E−03 | 8.737E−05 | 0.000E+00 |
| 5 | 0.000E+00 | −2.384E−02 | 5.998E−03 | −1.311E−03 | 9.737E−05 | 0.000E+00 |
| 6 | 0.000E+00 | −4.809E−03 | −7.481E−04 | 1.351E−04 | −5.600E−07 | 0.000E+00 |
| 7 | 0.000E+00 | −2.084E−02 | 1.720E−03 | 4.019E−05 | 3.612E−05 | 0.000E+00 |
| 8 | 0.000E+00 | −2.404E−02 | 1.316E−03 | 5.198E−04 | −6.055E−05 | 0.000E+00 |
| 9 | 0.000E+00 | −1.360E−02 | 8.331E−04 | 1.639E−04 | −1.908E−05 | 0.000E+00 |
| 10 | 0.000E+00 | −1.138E−02 | 1.871E−03 | −1.843E−04 | 2.483E−06 | 0.000E+00 |
| 11 | −5.550E+00 | −1.235E−02 | 3.108E−03 | −2.178E−04 | 3.846E−06 | 0.000E+00 |
| 12 | 1.247E+00 | −1.234E−02 | 1.988E−03 | −1.019E−04 | 1.752E−06 | 0.000E+00 |
| 13 | −7.849E+00 | −1.135E−02 | 1.128E−03 | −8.308E−05 | 2.996E−06 | −4.39E−08 |

TABLE 13

| | |
|---|---|
| Focal length | 7.505 |
| F-number | 1.88 |
| Half angle of view (°) | 33.29 |
| Image height | 4.900 |
| Lens total length | 9.468 |
| BF (in air) | 1.883 |

Embodiment 5

Figure 9:
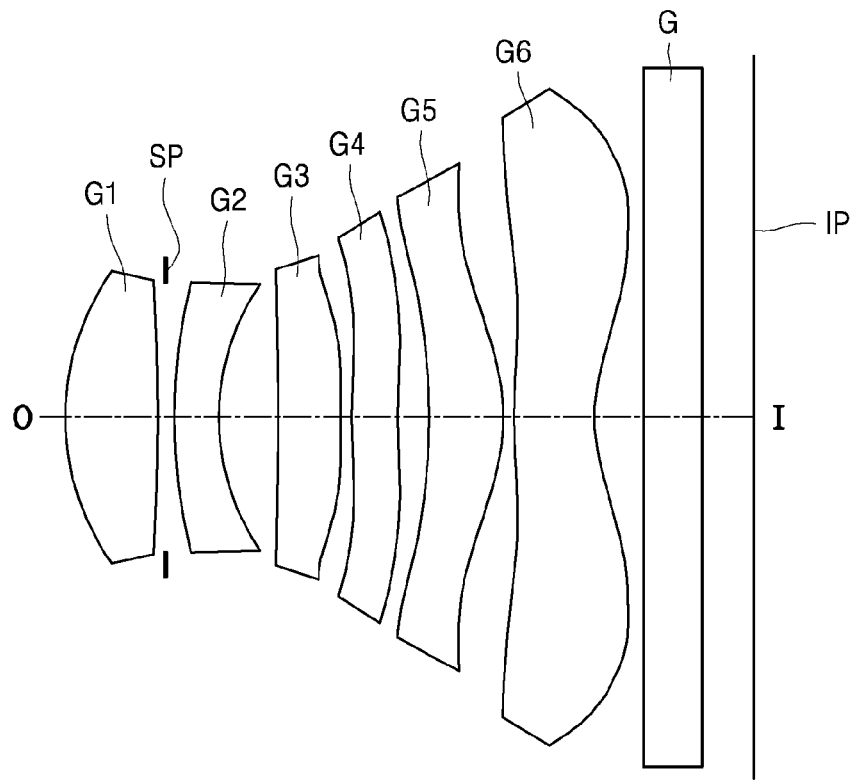
FIG. 9 illustrates a photographing optical lens assembly, according to a fifth embodiment.
Figure 10:
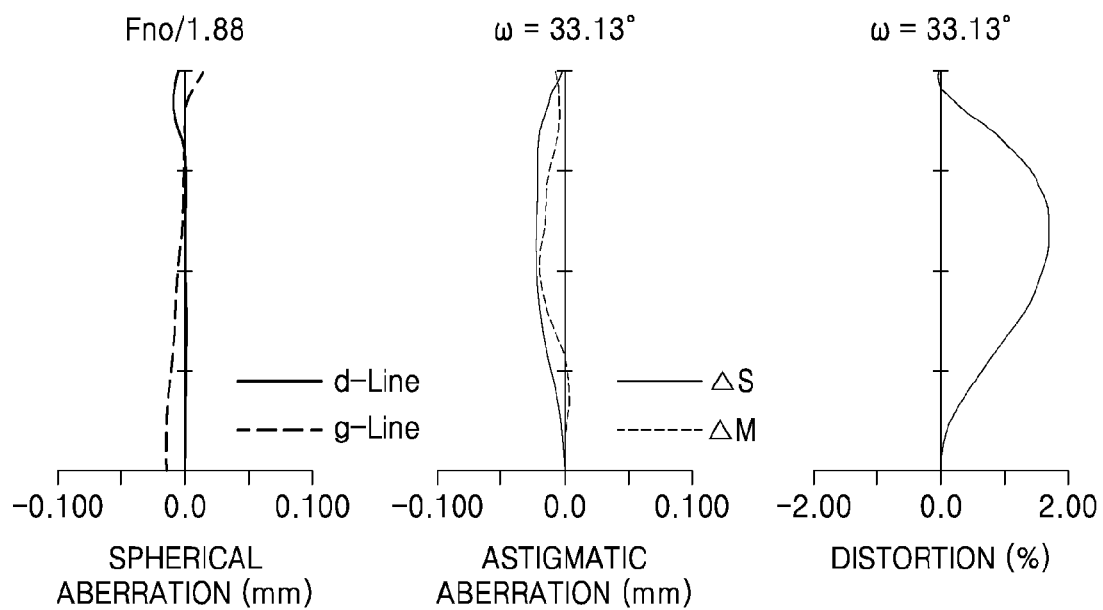
FIG. 10 illustrates aberration diagrams of the photographing optical lens assembly illustrated in FIG. 9.

Tables 14 to 16 show lens data according to a fifth embodiment. FIG. 9 illustrates a photographing optical lens assembly according to the fifth embodiment. FIG. 10 illustrates aberration diagrams of the photographing optical lens assembly of the fifth embodiment.

TABLE 14

| Lens surfaces | r | d | nd | vd |
|---|---|---|---|---|
| Object side | ∞ | ∞ | | |
| 1* | 3.398 | 1.260 | 1.53113 | 55.75 |
| 2* | −24.515 | 0.100 | | |
| 3 (aperture stop) | ∞ | 0.135 | | |
| 4* | 4.927 | 0.600 | 1.65055 | 21.53 |
| 5* | 2.475 | 0.816 | | |
| 6* | −98.855 | 0.880 | 1.53113 | 55.75 |
| 7* | −18.588 | 0.150 | | |
| 8* | 10.780 | 0.630 | 1.65055 | 21.53 |
| 9* | 11.460 | 0.464 | | |
| 10* | −11.723 | 1.000 | 1.53113 | 55.75 |
| 11* | −3.053 | 0.150 | | |
| 12* | 8.268 | 1.120 | 1.53113 | 55.75 |
| 13* | 2.427 | 0.670 | | |
| 14 | ∞ | 0.800 | 1.51680 | 64.20 |
| 15 | ∞ | 0.700 | | |
| Image plane | ∞ | | | |

TABLE 15

| Lens surfaces | K | A4 | A6 | A8 | A10 | A12 |
|---|---|---|---|---|---|---|
| 1 | 0.000E+00 | 4.256E−04 | −8.649E−05 | 3.220E−05 | −3.001E−06 | 0.000E+00 |
| 2 | 0.000E+00 | 2.341E−03 | 9.344E−04 | −3.183E−04 | 3.061E−05 | 0.000E+00 |
| 4 | 0.000E+00 | −1.829E−02 | 4.958E−03 | −1.063E−03 | 8.783E−05 | 0.000E+00 |
| 5 | 0.000E+00 | −2.741E−02 | 5.649E−03 | −1.187E−03 | 1.075E−04 | 0.000E+00 |
| 6 | 0.000E+00 | −5.129E−03 | −3.758E−04 | 4.468E−05 | 9.191E−05 | 0.000E+00 |
| 7 | 0.000E+00 | −2.051E−02 | 1.160E−03 | 2.480E−05 | 6.134E−05 | 0.000E+00 |
| 8 | 0.000E+00 | −2.352E−02 | 3.700E−04 | 5.309E−04 | −5.273E−05 | 0.000E+00 |
| 9 | 0.000E+00 | −2.057E−02 | 1.136E−03 | 1.409E−04 | −1.441E−05 | 0.000E+00 |
| 10 | 0.000E+00 | −1.100E−02 | 1.633E−03 | −5.138E−05 | −7.724E−07 | 0.000E+00 |
| 11 | −6.384E+00 | −7.934E−03 | 2.720E−03 | −2.210E−04 | 5.830E−06 | 0.000E+00 |
| 12 | −1.219E+01 | −1.848E−02 | 2.102E−03 | −9.820E−05 | 1.667E−06 | 0.000E+00 |
| 13 | −5.346E+00 | −1.213E−02 | 1.124E−03 | −8.094E−05 | 2.996E−06 | −4.82E−08 |

TABLE 16

| Focal length | 7.504 |
|---|---|
| F-number | 1.88 |
| Half angle of view (°) | 33.29 |
| Image height | 4.900 |
| Lens total length | 9.474 |
| BF (in air) | 1.897 |

TABLE 19

| Focal length | 7.499 |
|---|---|
| F-number | 1.87 |
| Half angle of view (°) | 33.29 |
| Image height | 4.900 |
| Lens total length | 9.500 |
| BF (in air) | 1.920 |

Embodiment 6

Figure 11:
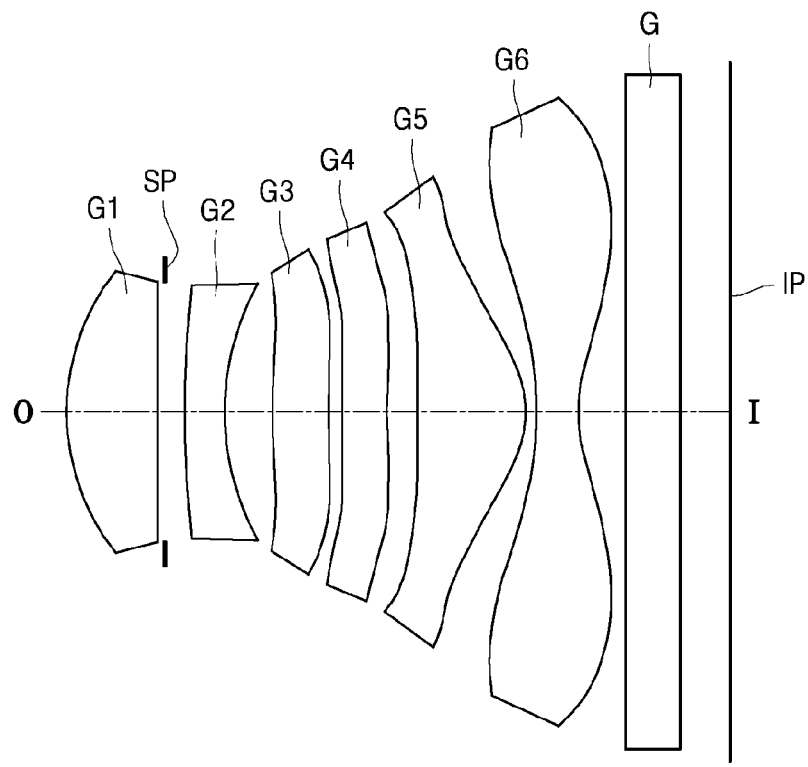
FIG. 11 illustrates a photographing optical lens assembly, according to a sixth embodiment.
Figure 12:
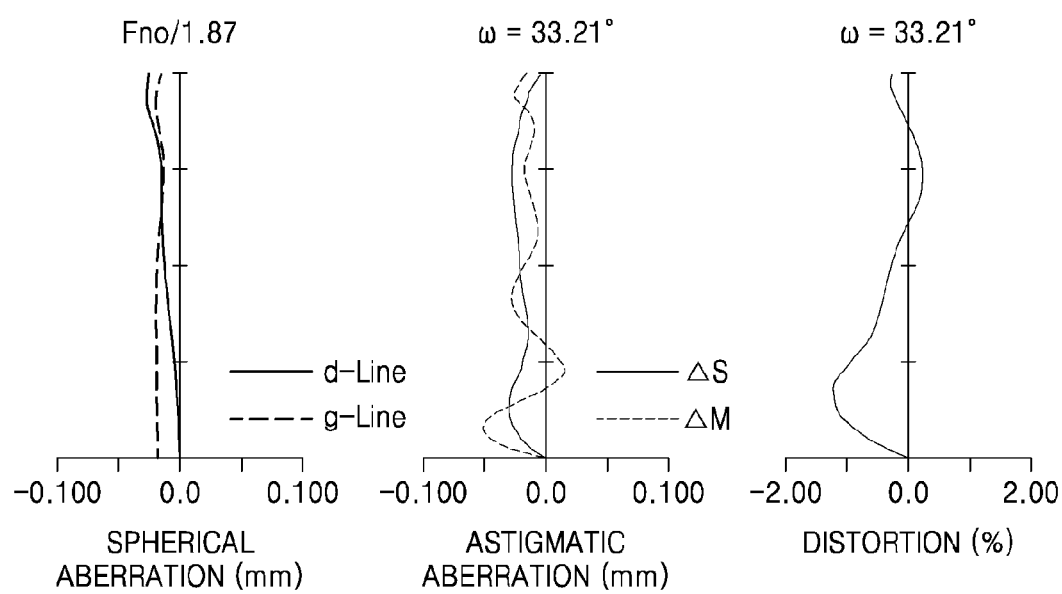
FIG. 12 illustrates aberration diagrams of the photographing optical lens assembly illustrated in FIG. 11.

Tables 17 to 19 show lens data according to a sixth embodiment. FIG. 11 illustrates a photographing optical lens assembly according to the sixth embodiment. FIG. 12 illustrates aberration diagrams of the photographing optical lens assembly of the sixth embodiment.

TABLE 17

| Lens surfaces | r | d | nd | vd |
|---|---|---|---|---|
| Object side | ∞ | ∞ | | |
| 1* | 3.254 | 1.300 | 1.53113 | 55.75 |
| 2* | −168.863 | 0.100 | | |
| 3 (aperture stop) | ∞ | 0.279 | | |
| 4* | 7.368 | 0.580 | 1.65055 | 21.53 |
| 5* | 3.086 | 0.683 | | |
| 6* | 13.524 | 0.810 | 1.53113 | 55.75 |
| 7* | 15.937 | 0.187 | | |
| 8* | 10.980 | 0.650 | 1.65055 | 21.53 |
| 9* | 11.283 | 0.448 | | |
| 10* | 49.961 | 1.540 | 1.53113 | 55.75 |
| 11* | −1.223 | 0.150 | | |
| 12* | −5.820 | 0.580 | 1.53113 | 55.75 |
| 13* | 1.315 | 0.693 | | |
| 14 | ∞ | 0.800 | 1.51680 | 64.20 |
| 15 | ∞ | 0.700 | | |
| Image plane | ∞ | | | |

TABLE 18

| Lens surfaces | K | A4 | A6 | A8 | A10 | A12 |
|---|---|---|---|---|---|---|
| 1 | 0.000E+00 | 5.624E−04 | 2.379E−04 | −2.297E−05 | 1.041E−05 | 0.000E+00 |
| 2 | 0.000E+00 | 8.828E−04 | 1.019E−03 | −2.116E−04 | 1.383E−05 | 0.000E+00 |
| 4 | 0.000E+00 | −1.694E−02 | 4.645E−03 | −9.747E−04 | 6.047E−05 | 0.000E+00 |
| 5 | 0.000E+00 | −2.088E−02 | 5.705E−03 | −1.185E−03 | 1.171E−04 | 0.000E+00 |
| 6 | 0.000E+00 | −6.293E−03 | −5.250E−04 | −1.075E−04 | −1.686E−05 | 0.000E+00 |
| 7 | 0.000E+00 | −2.060E−02 | 1.954E−03 | −4.099E−04 | 3.549E−05 | 0.000E+00 |
| 8 | 0.000E+00 | −3.143E−02 | 9.862E−04 | 7.177E−04 | −6.576E−05 | 0.000E+00 |
| 9 | 0.000E+00 | −2.538E−02 | 1.206E−03 | 1.758E−04 | −1.109E−05 | 0.000E+00 |
| 10 | 0.000E+00 | −1.537E−02 | 2.332E−03 | −2.535E−04 | 8.048E−06 | 0.000E+00 |
| 11 | −4.537E+00 | −1.962E−02 | 4.913E−03 | −3.619E−04 | 7.981E−06 | 0.000E+00 |
| 12 | 5.230E−01 | −5.214E−03 | 1.608E−03 | −9.109E−05 | 1.796E−06 | 0.000E+00 |
| 13 | −8.587E+00 | −1.201E−02 | 1.357E−03 | −1.009E−04 | 3.645E−06 | −5.17E−08 |

Embodiment 7

Figure 13:
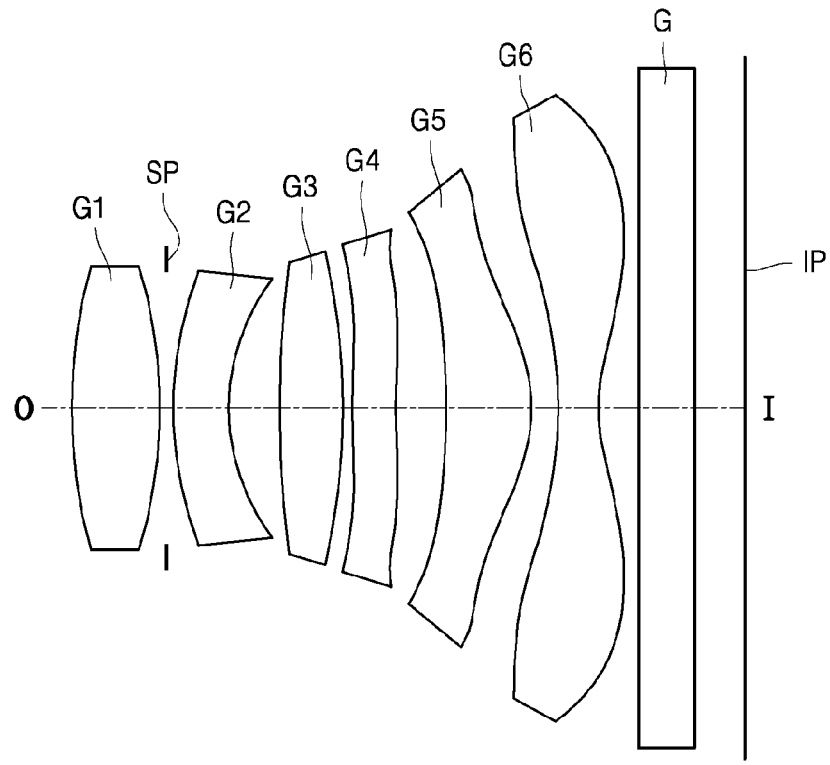
FIG. 13 illustrates a photographing optical lens assembly, according to a seventh embodiment.
Figure 14:
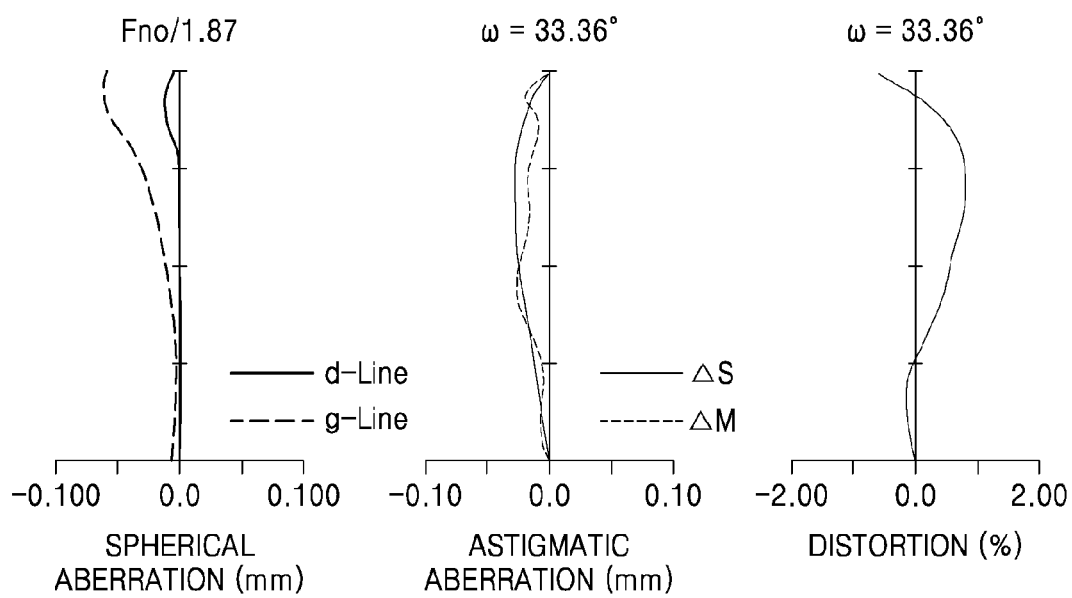
FIG. 14 illustrates aberration diagrams of the photographing optical lens assembly illustrated in FIG. 13.

Tables 20 to 22 show lens data according to a seventh embodiment. FIG. 13 illustrates a photographing optical lens assembly according to the seventh embodiment. FIG. 14 illustrates aberration diagrams of the photographing optical lens assembly of the seventh embodiment.

TABLE 20

| Lens surfaces | r | d | nd | vd |
|---|---|---|---|---|
| Object side | ∞ | ∞ | | |
| 1* | 5.142 | 1.230 | 1.53113 | 55.75 |
| 2* | −7.090 | 0.100 | | |
| 3 (aperture stop) | ∞ | 0.096 | | |
| 4* | 5.075 | 0.790 | 1.65055 | 21.53 |
| 5* | 2.422 | 0.717 | | |
| 6* | 20.211 | 0.880 | 1.53113 | 55.75 |
| 7* | −33.725 | 0.150 | | |
| 8* | 11.091 | 0.590 | 1.65055 | 21.53 |
| 9* | 11.078 | 0.709 | | |
| 10* | −35.467 | 1.250 | 1.53113 | 55.75 |
| 11* | −1.980 | 0.348 | | |
| 12* | −8.460 | 0.580 | 1.53113 | 55.75 |
| 13* | 2.153 | 0.560 | | |
| 14 | ∞ | 0.800 | 1.51680 | 64.20 |
| 15 | ∞ | 0.700 | | |
| Image plane | ∞ | | | |

TABLE 21

| Lens surfaces | K | A4 | A6 | A8 | A10 | A12 |
|---|---|---|---|---|---|---|
| 1 | 0.000E+00 | −3.881E−03 | −9.539E−04 | 7.813E−05 | −1.952E−05 | 0.000E+00 |
| 2 | 0.000E+00 | 1.624E−03 | 2.548E−04 | −2.875E−04 | 2.044E−05 | 0.000E+00 |
| 4 | 0.000E+00 | −1.179E−02 | 5.452E−03 | −1.029E−03 | 8.013E−05 | 0.000E+00 |
| 5 | 0.000E+00 | −2.911E−02 | 6.343E−03 | −1.146E−03 | 5.777E−05 | 0.000E+00 |
| 6 | 0.000E+00 | −1.197E−03 | −3.133E−04 | 5.696E−05 | 4.371E−05 | 0.000E+00 |
| 7 | 0.000E+00 | −1.278E−02 | 6.894E−04 | −9.357E−05 | 3.253E−05 | 0.000E+00 |
| 8 | 0.000E+00 | −2.583E−02 | 8.841E−04 | 5.451E−04 | −5.395E−05 | 0.000E+00 |
| 9 | 0.000E+00 | −2.217E−02 | 1.304E−03 | 1.998E−04 | −8.668E−06 | 0.000E+00 |
| 10 | 0.000E+00 | −1.085E−02 | 8.879E−04 | −6.950E−05 | 2.989E−06 | 0.000E+00 |
| 11 | −5.707E+00 | −1.022E−02 | 2.995E−03 | −2.205E−04 | 4.113E−06 | 0.000E+00 |
| 12 | 1.890E+00 | −9.593E−03 | 1.895E−03 | −1.026E−04 | 1.916E−06 | 0.000E+00 |
| 13 | −9.819E+00 | −1.151E−02 | 1.127E−03 | −8.205E−05 | 3.042E−06 | −4.73E−08 |

TABLE 22

| | |
|---|---|
| Focal length | 7.487 |
| F-number | 1.87 |
| Half angle of view (°) | 33.29 |
| Image height | 4.900 |
| Lens total length | 9.500 |
| BF (in air) | 1.787 |

Embodiment 8

Figure 15:
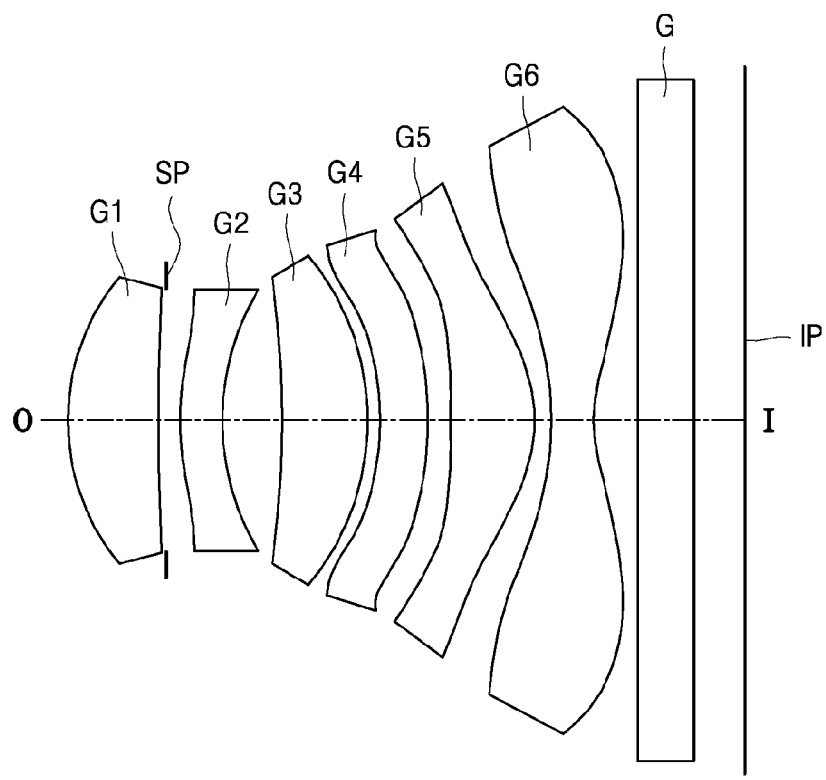
FIG. 15 illustrates a photographing optical lens assembly, according to an eighth embodiment.
Figure 16:
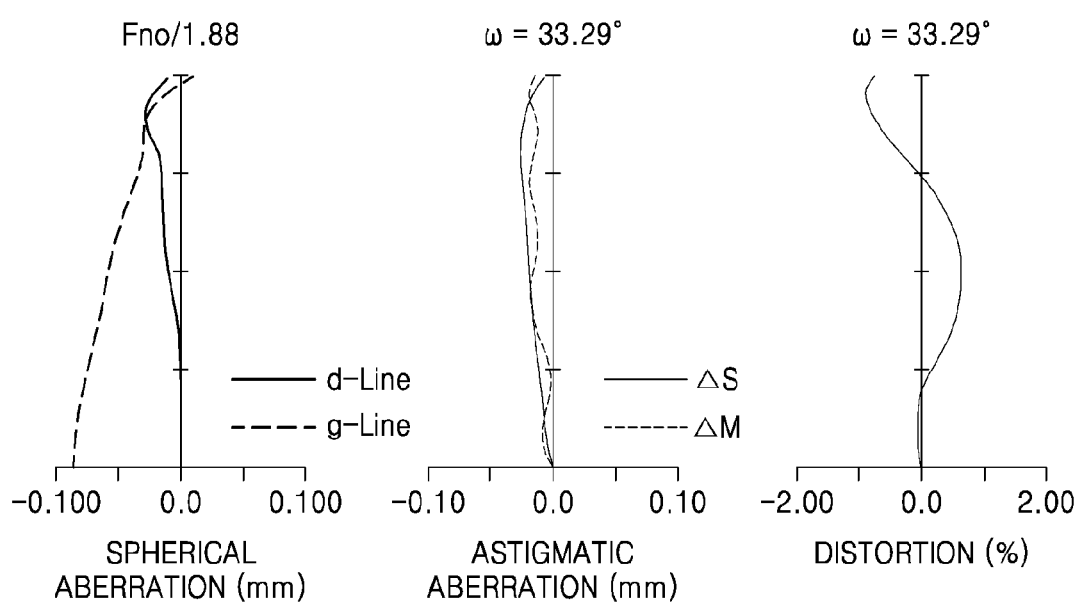
FIG. 16 illustrates aberration diagrams of the photographing optical lens assembly illustrated in FIG. 15.

Tables 23 to 25 show lens data according to an eighth embodiment. FIG. 15 illustrates a photographing optical lens assembly according to the eighth embodiment. FIG. 16 illustrates aberration diagrams of the photographing optical lens assembly of the eighth embodiment.

TABLE 23

| Lens surfaces | r | d | nd | vd |
|---|---|---|---|---|
| Object side | ∞ | ∞ | | |
| 1* | 3.211 | 1.280 | 1.53113 | 55.75 |
| 2* | 16.055 | 0.100 | | |
| 3 (aperture stop) | ∞ | 0.208 | | |
| 4* | 4.178 | 0.580 | 1.65055 | 21.53 |
| 5* | 2.921 | 0.847 | | |
| 6* | −36.471 | 1.180 | 1.53113 | 55.75 |
| 7* | −7.156 | 0.175 | | |
| 8* | −5.858 | 0.700 | 1.65055 | 21.53 |
| 9* | −6.000 | 0.332 | | |
| 10* | −25.550 | 1.170 | 1.53113 | 55.75 |
| 11* | −1.815 | 0.244 | | |
| 12* | −4.805 | 0.580 | 1.53113 | 55.75 |
| 13* | 2.077 | 0.605 | | |
| 14 | ∞ | 0.800 | 1.51680 | 64.20 |
| 15 | ∞ | 0.700 | | |
| Image plane | ∞ | | | |

TABLE 24

| Lens surfaces | K | A4 | A6 | A8 | A10 | A12 |
|---|---|---|---|---|---|---|
| 1 | 0.000E+00 | 6.242E−04 | 2.200E−04 | −2.353E−06 | 6.726E−06 | 0.000E+00 |
| 2 | 0.000E+00 | −1.129E−02 | 4.400E−03 | −7.993E−04 | 5.335E−05 | 0.000E+00 |
| 4 | 0.000E+00 | −2.906E−02 | 5.711E−03 | −8.446E−04 | 7.171E−06 | 0.000E+00 |
| 5 | 0.000E+00 | −2.200E−02 | 4.470E−03 | −5.047E−04 | 3.960E−05 | 0.000E+00 |
| 6 | 0.000E+00 | −9.394E−03 | 9.490E−04 | −3.007E−04 | 7.230E−05 | 0.000E+00 |
| 7 | 0.000E+00 | −3.739E−02 | 5.268E−03 | −3.138E−04 | 2.061E−05 | 0.000E+00 |
| 8 | 0.000E+00 | −2.974E−02 | 1.621E−03 | 7.105E−04 | −5.013E−05 | 0.000E+00 |
| 9 | 0.000E+00 | −1.046E−02 | −3.443E−04 | 1.029E−04 | 1.493E−05 | 0.000E+00 |
| 10 | 0.000E+00 | −1.819E−02 | 1.263E−03 | −7.883E−05 | 4.589E−06 | 0.000E+00 |
| 11 | −5.283E+00 | −1.662E−02 | 3.310E−03 | −2.003E−04 | 3.010E−06 | 0.000E+00 |
| 12 | −1.705E+00 | −8.573E−03 | 1.991E−03 | −1.183E−04 | 2.260E−06 | 0.000E+00 |
| 13 | −9.590E+00 | −9.915E−03 | 9.747E−04 | −7.707E−05 | 3.139E−06 | −5.35E−08 |

TABLE 25

| | |
|---|---|
| Focal length | 7.500 |
| F-number | 1.88 |
| Half angle of view (°) | 33.29 |
| Image height | 4.900 |
| Lens total length | 9.500 |
| BF (in air) | 1.832 |

As described above, according to the various embodiments of the invention, the photographing optical lens assembly includes six lenses, and the shapes and curvatures of the lenses are adjusted so that the photographing optical lens assembly may have a small F-number (Fno), a small size, and a high degree of imaging performance. For example, the photographing optical lens assembly may be used in electronic devices, e.g., video cameras, digital still cameras, cellular phones or portable information terminals having cameras, and other electronic devices having image capturing capability.

Figure 17:
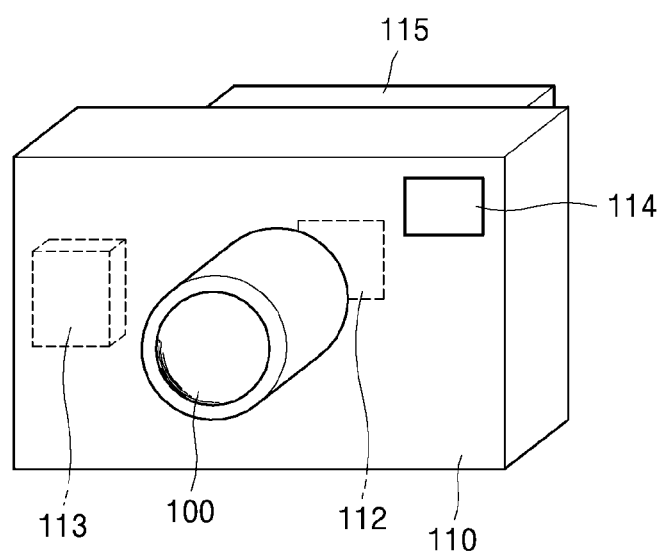
FIG. 17 schematically illustrates a photographing apparatus including photographing optical lens assembly, according to an embodiment.

FIG. 17 is a schematic view illustrating a photographing apparatus including photographing optical lens assembly 100, according to an embodiment. The photographing apparatus includes the photographing optical lens assembly 100 that form optical images and a photographing device 112 that converts the optical images into electric signals. The photographing optical lens assembly 100 may be any set of photographing optical lens assembly described with reference to FIGS. 1 to 16. The photographing apparatus includes a housing 110 to which the photographing optical lens assembly 100 are detachably attached, and the photographing device 112 is disposed in the housing 110. The photographing apparatus may include a recording medium 113 and a viewfinder 114. Information about objects may be photo-electrically converted by the photographing device 112 and recorded in the recording medium 113. The viewfinder 114 may be used to view an object to be photographed. The photographing apparatus may include a display unit 115 to display object images. In the current embodiment, both the viewfinder 114 and the display unit 115 are provided. In other embodiments, however, only the display unit 115 may be provided. The photographing apparatus illustrated in FIG. 17 is only a non-limiting example to which the embodiments of the photographing optical lens assembly are applied. In other examples, the photographing optical lens assembly may be used in a camera or a mobile optical apparatus, or another electronic device with image capturing capability. If the photographing optical lens assembly of the embodiments is used in an electronic apparatus such as a digital camera or mobile phone, the electronic apparatus may have a small size and high performance in capturing bright images.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

It should be understood that the exemplary embodiments described therein should be considered in a descriptive sense only and not for purposes of limitation. Descriptions of features or aspects within each embodiment should typically be considered as available for other similar features or aspects in other embodiments. While one or more embodiments of the invention have been described with reference to the figures, it will be understood by those of ordinary skill in the art that various changes in form and details may be made therein without departing from the spirit and scope of the invention as defined by the following claims.

What is claimed is:

1. Photographing optical lens assembly comprising:
a first lens having a positive refractive power;
a second lens having a negative refractive power;
a third lens;
a fourth lens;
a fifth lens having a positive refractive power; and
a sixth lens having a negative refractive power,
wherein the first to sixth lenses are sequentially arranged from an object side to an image side, the sixth lens has a concave image-side surface in a region around an optical axis, and the photographing optical lens assembly satisfies the following formulas:

$$-1.4 < f2/f < -0.5, \text{ and}$$

$$1.0 < f3/f < 3.0, \qquad \text{<Formulas>}$$

where f2 denotes a focal length of the second lens, f3 denotes a focal length of the third lens, and f denotes a focal length of the photographing optical lens assembly.

2. The photographing optical lens assembly of claim 1, wherein the sixth lens has at least one inflection point at a position that does not intersect the optical axis.

3. The photographing optical lens assembly of claim 1, wherein the first lens has a convex object-side surface, and the second lens has a concave image-side surface.

4. The photographing optical lens assembly of claim 1, wherein the photographing optical lens assembly satisfies the following formula:

$$20 < v1 - v2 < 70, \quad \text{<Formula>}$$

where v1 denotes an Abbe number of the first lens, and v2 denotes an Abbe number of the second lens.

5. The photographing optical lens assembly of claim 1, wherein the sixth lens has a bi-concave shape in a region around the optical axis.

6. The photographing optical lens assembly of claim 5, wherein the photographing optical lens assembly satisfies the following formulas:

$$0.2 < f5/f < 1.5,$$

$$-1.5 < f6/f < -0.1, \quad \text{<Formulas>}$$

where f5 denotes a focal length of the fifth lens, f6 denotes a focal length of the sixth lens, and f denotes the focal length of the photographing optical lens assembly.

7. The photographing optical lens assembly of claim 1, wherein the photographing optical lens assembly satisfies the following formula:

$$-2.0 < (r11 + r12)/(r11 - r12) < -0.1, \quad \text{<Formula>}$$

where r11 denotes a paraxial radius of curvature of an object-side surface of the first lens, and r12 denotes a paraxial radius of curvature of an image-side surface of the first lens.

8. The photographing optical lens assembly of claim 1, wherein the first to sixth lenses are formed of a plastic material.

9. The photographing optical lens assembly of claim 1, wherein the photographing optical lens assembly satisfies the following formulas:

$$r11 < |r12|,$$

$$|r52| < |r42|, \quad \text{<Formulas>}$$

where r11 denotes a paraxial radius of curvature of an object-side surface of the first lens, r12 denotes a paraxial radius of curvature of an image-side surface of the first lens, r42 denotes the paraxial radius of curvature of the image-side surface of the fourth lens, and r52 denotes a paraxial radius of curvature of an image-side surface of the fifth lens.

10. The photographing optical lens assembly of claim 1, wherein the third lens has a positive refractive power and the fourth lens has a negative refractive power.

11. Photographing optical lens assembly comprising:
a first lens having a positive refractive power;
a second lens having a negative refractive power;
a third lens;
a fourth lens;
a fifth lens having a positive refractive power; and
a sixth lens having a negative refractive power,
wherein the first to sixth lenses are sequentially arranged from an object side to an image side, the third lens has a concave meniscus shape toward the image side in a region around the optical axis, the sixth lens has a concave image-side surface in a region around an optical axis, and the photographing optical lens assembly satisfies the following formulas:

$$-2.5 < f2/f < -0.5, \text{ and}$$

$$1.0 < f3/f < 3.0, \quad \text{<Formulas>}$$

where f2 denotes a focal length of the second lens, f3 denotes a focal length of the third lens, and f denotes a focal length of the photographing optical lens assembly.

12. The photographing optical lens assembly of claim 11, wherein the third lens has a positive refractive power.

13. Photographing optical lens assembly comprising:
a first lens having a positive refractive power;
a second lens having a negative refractive power;
a third lens;
a fourth lens;
a fifth lens having a positive refractive power; and
a sixth lens having a negative refractive power,
wherein the first to sixth lenses are sequentially arranged from an object side to an image side, the fourth lens has a concave image-side surface in a region around the optical axis, the fourth lens has at least one inflection point at a position that does not intersect the optical axis, the sixth lens has a concave image-side surface in a region around an optical axis, and the photographing optical lens assembly satisfies the following formulas:

$$-2.5 < f2/f < -0.5, \text{ and}$$

$$1.0 < f3/f < 3.0, \quad \text{<Formulas>}$$

where f2 denotes a focal length of the second lens, f3 denotes a focal length of the third lens, and f denotes a focal length of the photographing optical lens assembly.

14. The photographing optical lens assembly of claim 13, wherein the fourth lens has a positive refractive power.

15. Photographing optical lens assembly comprising:
a first lens having a positive refractive power;
a second lens having a negative refractive power;
a third lens;
a fourth lens;
a fifth lens having a positive refractive power; and
a sixth lens having a negative refractive power,
wherein the first to sixth lenses are sequentially arranged from an object side to an image side, the sixth lens has a concave image-side surface in a region around an optical axis, and wherein the photographing optical lens assembly satisfies the following formulas:

$$0.4 < f1/f < 1.2,$$

$$1.0 < f3/f < 3.0,$$

$$1.0 < f4/f, \quad \text{<Formulas>}$$

where f1 denotes a focal length of the first lens, f3 denotes a focal length of the third lens, f4 denotes a focal length of the fourth lens, and f denotes the focal length of the photographing optical lens assembly.

* * * * *